(12) United States Patent
Chou et al.

(10) Patent No.: US 10,356,007 B2
(45) Date of Patent: Jul. 16, 2019

(54) DYNAMIC SERVICE ORCHESTRATION WITHIN PAAS PLATFORMS

(71) Applicant: INTERNATIONAL BUSINESS MACHINES CORPORATION, Armonk, NY (US)

(72) Inventors: Wei-Ting Chou, Taipei (TW); Cheng-Ta Lee, Taipei (TW); Jeffrey C. H. Liu, Taipei (TW); Hao-Ting Shih, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/803,930

(22) Filed: Nov. 6, 2017

(65) Prior Publication Data
US 2018/0063032 A1 Mar. 1, 2018

Related U.S. Application Data

(63) Continuation of application No. 14/672,438, filed on Mar. 30, 2015, now Pat. No. 9,912,613.

(51) Int. Cl.
*H04L 12/64* (2006.01)
*H04L 29/06* (2006.01)
(Continued)

(52) U.S. Cl.
CPC ............ *H04L 49/25* (2013.01); *H04L 12/64* (2013.01); *H04L 45/00* (2013.01); *H04L 45/38* (2013.01);
(Continued)

(58) Field of Classification Search
CPC ......... H04L 49/25; H04L 45/38; H04L 12/64; H04L 67/16; H04L 12/5689; H04L 45/34
See application file for complete search history.

(56) References Cited

U.S. PATENT DOCUMENTS 9,071,529 B2   6/2015   Garg et al.
9,485,187 B2   11/2016  Zhang
(Continued)

FOREIGN PATENT DOCUMENTS

WO   2014021849 A1   2/2014

OTHER PUBLICATIONS

IBM, "List of IBM Patents or Patent Applications Treated as Related (Appendix P)," Apr. 13, 2018, p. 1-2.
(Continued)

*Primary Examiner* — Brian T O Connor
(74) *Attorney, Agent, or Firm* — Robert C. Bunker

(57) ABSTRACT

According to one exemplary embodiment, a method for orchestrating a flow of a packet through a software-defined network (SDN) switch is provided. The method may include determining at least one available service associated with the SDN switch. The method may also include receiving the packet at an input port associated with the SDN switch, wherein the packet has a destination value and a packet type. The method may then include generating a flow entry based on the at least one available service and the packet type, wherein the flow entry has a plurality of entry characteristics and an action. The method may further include selecting the flow entry based on matching the plurality of entry characteristics to the destination value and the packet type. The method may also include performing the action associated with the selected flow entry.

20 Claims, 11 Drawing Sheets

(51) Int. Cl.
  *H04L 29/08* (2006.01)
  *H04L 12/701* (2013.01)
  *H04L 12/721* (2013.01)
  *H04L 12/947* (2013.01)

(52) U.S. Cl.
  CPC .......... *H04L 67/10* (2013.01); *H04L 67/1097* (2013.01); *H04L 67/16* (2013.01); *H04L 67/2804* (2013.01); *H04L 67/42* (2013.01); *H04L 45/34* (2013.01)

(56) References Cited

U.S. PATENT DOCUMENTS

| | | | |
|---|---|---|---|
| 9,525,618 | B2 | 12/2016 | DeCusatis et al. |
| 9,560,079 | B1 | 1/2017 | Lucovsky et al. |
| 9,584,477 | B2 | 2/2017 | Williams et al. |
| 9,654,395 | B2 | 5/2017 | Park et al. |
| 9,912,613 | B2 * | 3/2018 | Chou ...................... H04L 49/25 |
| 2010/0082737 | A1 | 4/2010 | Dankle et al. |
| 2013/0166703 | A1 | 6/2013 | Hammer et al. |
| 2014/0074973 | A1 | 3/2014 | Kumar et al. |
| 2014/0189074 | A1 | 7/2014 | Parker |
| 2014/0215036 | A1 | 7/2014 | Elzur |
| 2014/0215465 | A1 | 7/2014 | Elzur |
| 2014/0301192 | A1 | 10/2014 | Lee et al. |
| 2014/0317261 | A1 | 10/2014 | Shatzkamer et al. |
| 2014/0325038 | A1 | 10/2014 | Kis |
| 2016/0050140 | A1 | 2/2016 | Chinni et al. |
| 2016/0080251 | A1 | 3/2016 | Ramachandran et al. |
| 2016/0080285 | A1 | 3/2016 | Ramachandran et al. |
| 2016/0218973 | A1 | 7/2016 | Anand |
| 2016/0234097 | A1 | 8/2016 | Chang |
| 2016/0294732 | A1 | 10/2016 | Chou et al. |

OTHER PUBLICATIONS

Griffin et al., "Service Oriented Networking," European Conference on Networks and Communications (EuCNC), 2014, 5 Pages, IEEE, European Union's Seventh Framework Programme, FUSION (Future Service Oriented Networks) Project.

Kächele et al., "COSCA—An easy-to-use component-based PaaS cloud system for common applications," CloudCP 11, Apr. 10, 2011, 6 Pages, ACM, Salzburg, Austria.

Mell et al., "The NIST Definition of Cloud Computing," National Institute of Standards and Technology, Information Technology Laboratory, Oct. 7, 2009, 2 Pages, Version 15.

* cited by examiner

| flow entry | protocol | priority | in_port | nw_dst | actions |
|---|---|---|---|---|---|
| 1 | ip | 100 | 504a | 192.168.123.101 | Output 504b |
| 2 | ip | 100 | 504c | 192.168.123.101 | Output 504d |
| 3 | ip | 100 | 504e | 192.168.123.101 | Output 504f |
| 4 | ip | 100 | 504a | 192.168.123.102 | Output 504d |
| 5 | ip | 100 | 504e | 192.168.123.102 | Output 504f |
| 6 | | 0 | * | * | NORMAL |

| flow entry | protocol | nw_src | in_port | nw_dst | actions |
|---|---|---|---|---|---|
| 1 | ip | * | 504a | 192.168.123.103 | Output: 504b |
| 2 | ip | * | 504c | 192.168.123.103 | TO_CONTROLLER |
| 3 | ip | 192.168.1.1 | 504a | 192.168.123.103 | Output: 504d |
| 4 | ip | 192.168.1.1 | 504e | 192.168.123.103 | Output: 504f |
| 5 | | | | | |
| 6 | | 0 | * | * | NORMAL |

DYNAMIC SERVICE ORCHESTRATION WITHIN PAAS PLATFORMS

BACKGROUND

The present invention relates generally to the field of computing, and more particularly to Platform-As-A-Service (PaaS) services.

PaaS frameworks provide the core building block for cloud applications that allow developers to focus on code creation without having to worry about how an application may be scaled at runtime. To improve cloud application development, PaaS platforms typically provide a service feature that allows developers to use the services provided by the PaaS platform in the developer's application when the PaaS platform binds the application with the service instance at runtime. Services commonly present in PaaS platforms include queuing services, database services, or email services.

SUMMARY

According to one exemplary embodiment, a method for orchestrating a flow of a packet through a software-defined network (SDN) switch is provided. The method may include determining at least one available service associated with the SDN switch. The method may also include receiving the packet at an input port associated with the SDN switch, wherein the packet has a destination value and a packet type. The method may then include generating a flow entry based on the at least one available service and the packet type, wherein the flow entry has a plurality of entry characteristics and an action. The method may further include selecting the flow entry based on matching the plurality of entry characteristics to the destination value and the packet type. The method may also include performing the action associated with the selected flow entry.

According to another exemplary embodiment, a computer system for orchestrating a flow of a packet through a software-defined network (SDN) switch is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include determining at least one available service associated with the SDN switch. The method may also include receiving the packet at an input port associated with the SDN switch, wherein the packet has a destination value and a packet type. The method may then include generating a flow entry based on the at least one available service and the packet type, wherein the flow entry has a plurality of entry characteristics and an action. The method may further include selecting the flow entry based on matching the plurality of entry characteristics to the destination value and the packet type. The method may also include performing the action associated with the selected flow entry.

According to yet another exemplary embodiment, a computer program product for orchestrating a flow of a packet through a software-defined network (SDN) switch is provided. The computer program product may include one or more computer-readable storage devices and program instructions stored on at least one of the one or more tangible storage devices, the program instructions executable by a processor. The computer program product may include program instructions to determine at least one available service associated with the SDN switch. The computer program product may also include program instructions to receive the packet at an input port associated with the SDN switch, wherein the packet has a destination value and a packet type. The computer program product may then include program instructions to generate a flow entry based on the at least one available service and the packet type, wherein the flow entry has a plurality of entry characteristics and an action. The computer program product may further include program instructions to select the flow entry based on matching the plurality of entry characteristics to the destination value and the packet type. The computer program product may also include program instructions to perform the action associated with the selected flow entry.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 5B illustrates an exemplary flow table in a proactive scenario according to at least one embodiment;

FIG. 6B illustrates an exemplary flow table in a reactive scenario according to at least one embodiment;

DETAILED DESCRIPTION

Figure 1:
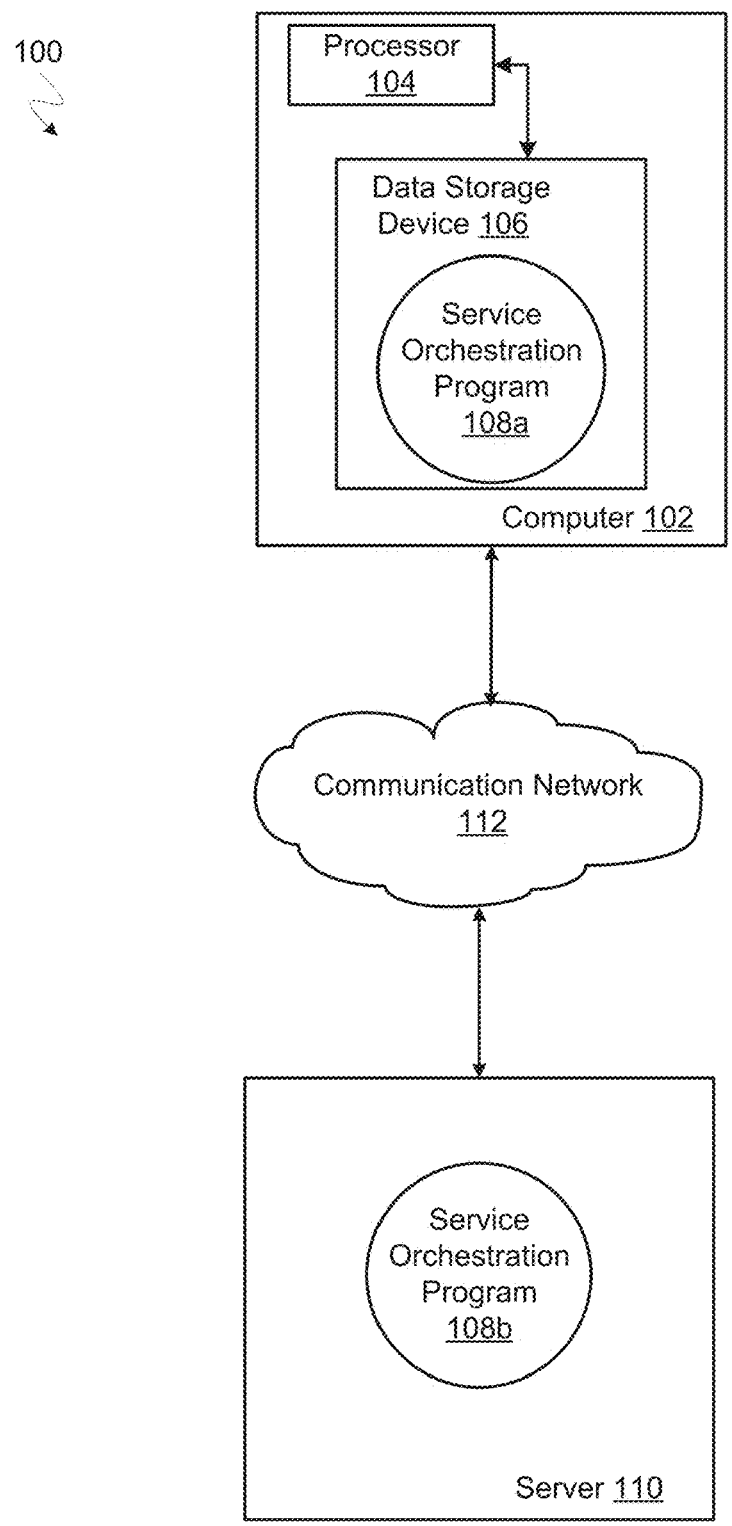
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for dynamic service orchestration in PaaS platforms. As such, the present embodiment has the capacity to improve the technical field of differentiating infrastructure services from application services by providing a service chaining mechanism that makes orchestration of infrastructure services feasible while minimizing performance impact. More specifically, packet flow through software-defined network (SDN) switches to application services may be dynamically altered by a service orchestrator, whereby packets may be sent to services based on the services available and the packet type.

As previously described, most Platform-As-A-Service (PaaS) frameworks provide a way for developers to use services (e.g., database services, email services, etc.) in an application. The PaaS platform may bind the application with the service instance at runtime. Some services may provide value to the application while being transparent to the developer. Such services may be categorized as infrastructure services. Example infrastructure services may include packet inspection services, packet capture services, and traffic control services.

A packet inspection service may inspect all network traffic targeted at a specific application to identify security flaws. Example packet inspection services may include Intrusion Detection and Prevention System (IDPS), malware detection, email spam detection, etc.

Packet capture services may capture all requests targeted at a specific application for analysis and auditing. Responses from the target application may also be captured. Example packet capture services may include web application program interface (API) monitors, IBM® QRadar® (IBM, QRadar and all IBM-based trademarks and logos are trademarks or registered trademarks of International Business Machines Corporation and/or its affiliates), etc.

Traffic control services allow administrators to define Service Level Management (SLM) policies to associate with a specific application. A traffic control service may restrict the number of requests that may be routed to the specific application. Example traffic control services may include Application Performance Monitoring (APM) management, traffic shaping, etc.

PaaS platforms may not provide well-defined, scalable mechanisms to differentiate infrastructure services from application services and may not associate the services with a target application.

Therefore, it may be advantageous to, among other things, provide a way to scalably orchestrate infrastructure services within PaaS platforms while minimizing performance impacts.

According to at least one embodiment, a service chaining mechanism may be added to a PaaS platform that makes orchestration of infrastructure services feasible with minimal impacts on performance. A service orchestrator may be implemented as a Software-Defined Network (SDN) controller in the gateway of the PaaS platform. The gateway may perform infrastructure service orchestration by generating service chaining SDN flow commands based on identified service routing policies. The flow command may be sent to the SDN switch at either configuration time (when running in proactive mode) or runtime (when running in reactive mode). Infrastructure services may be dynamically registered to the gateway to allow the gateway to determine the type of services available in the infrastructure and how to perform service chaining based on layer 2 (L2) information (e.g., media access control (MAC) address). Additionally, the service routing policy defined on the gateway may support conditional branching actions that allow the packet routing to be created at runtime.

At configuration time, the gateway may subscribe to a service registration message so the gateway may know what infrastructure services may be available for use. The gateway may look up L2 information from an Infrastructure-As-A-Service (IaaS) controller based on a service name and Internet Protocol (IP) address. Using the L2 information, an administrator may create a service chaining policy outlining a list of infrastructure services that need to be executed before a request may be routed to a target application. The gateway may then turn the policy into commands (e.g., OpenFlow commands) and populate the flow table of an SDN switch. According to at least one embodiment, the flow table may have multiple rows of flow table entries that contain fields corresponding to the protocol, priority, network source address, input port, network destination address and a designated action for the SDN switch to take. The action specified in the flow entry may indicate that a response to the SDN controller may be sent, indicate an SDN switch port to send out a packet, modify a destination MAC address to send the packet, or a combination of actions.

At runtime, the gateway may perform layer 3 (L3) routing based on the request header payload and the SDN switch may perform the service chaining based on the SDN switch's flow table. Processing service chaining may be offloaded to the SDN switch level in the interest of efficiency.

Additionally, to provide more flexibility for various chaining scenarios, the policy created by the gateway may contain a conditional branch operation that may have the SDN switch hold the request flow until the gateway makes a new routing decision based on the out-of-band response from one of the previously executed services. For example, one of the services may return a negative response to the gateway which may result in the gateway inserting a new set of OpenFlow rules to the SDN switch for subsequent routing.

Referring now to FIG. 1, an exemplary networked computer environment 100 in accordance with one embodiment is depicted. The networked computer environment 100 may include a computer 102 with a processor 104 and a data storage device 106 that is enabled to run a service orchestration program 108a. The networked computer environment 100 may also include a server 110 that is enabled to run a service orchestration program 108b and a communication network 112. The networked computer environment 100 may include a plurality of computers 102 and servers 110, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 110 via the communications network 112. The communications network 112 may include connections, such as wire, wireless communication links, or fiber optic cables. As will be discussed with reference to FIG. 7, server computer 110 may include internal components 902a and external components 904a, respectively and client computer 102 may include internal components 902b and external components 904b, respectively. Client computer 102 may be, for example, a mobile device, a telephone, a PDA, a netbook, a laptop computer, a tablet computer, a desktop computer, or any type of computing device capable of running a program and accessing a network.

A program, such as a service orchestration program 108a and 108b may run on the client computer 102 or on the server computer 110. The service orchestration program 108a and 108b may be used to scalably orchestrate services within a PaaS platform. The service orchestration program 108a and 108b is explained in further detail below with respect to FIGS. 3 and 4.

Figure 2:
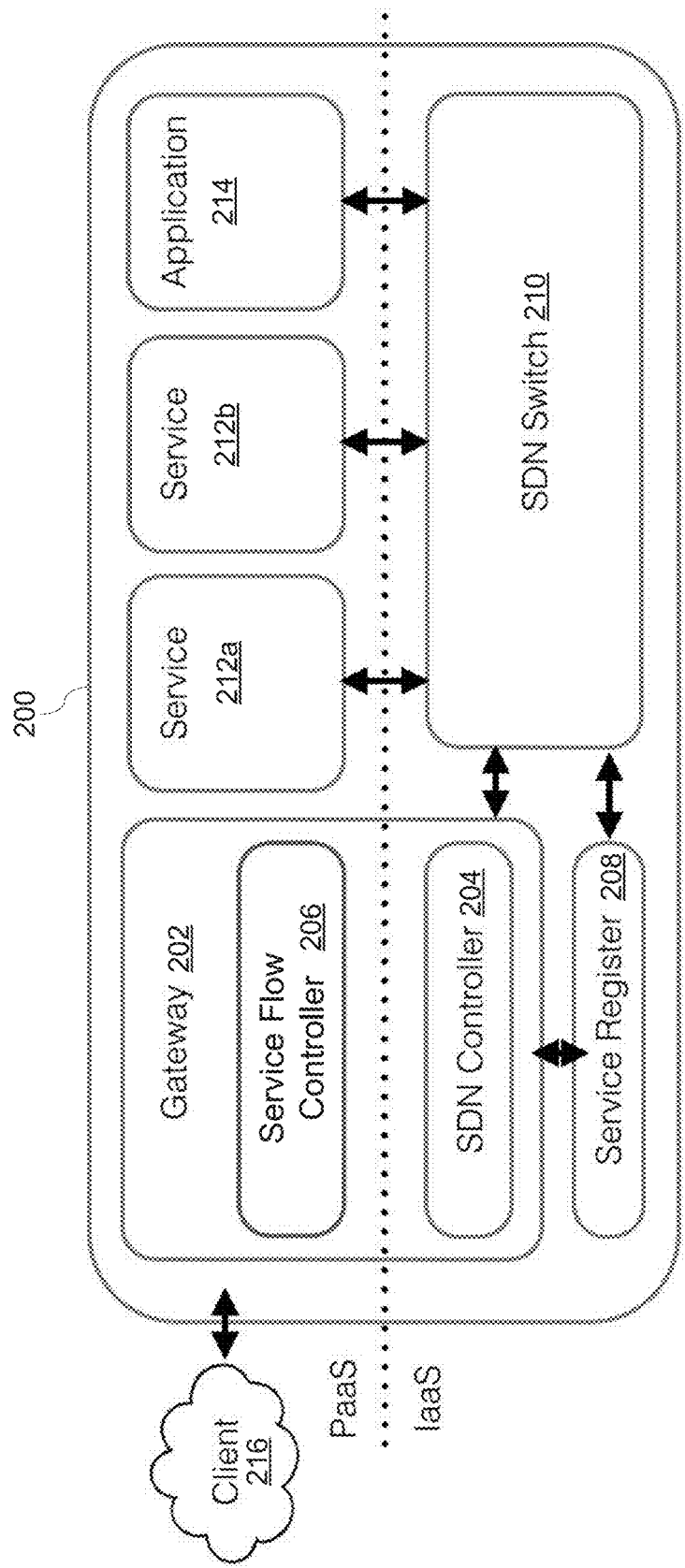
FIG. 2 is a block diagram of the dynamic service orchestration architecture according to at least one embodiment.

Referring now to FIG. 2, a block diagram of a service orchestration architecture 200 according to at least one embodiment is depicted. The service orchestration architecture 200 may include a gateway 202 having a software-defined network (SDN) controller 204 and a service flow controller 206. Additionally, the service orchestration architecture 200 may include a service register 208, an SDN switch 210, services 212a-b, and an application 214. The services 212a-b and application 214 may be accessed by the gateway 202 and service register 208 via the SDN switch 210.

The gateway 202 may perform infrastructure service orchestration using the SDN controller 204 and service flow controller 206. The SDN controller 204 may be an application in an SDN that manages traffic flow control to enable intelligent networking. The service flow controller 206 may be a controller used to generate and maintain service flow for each network transaction.

The service register 208 may be implemented as an application that registers and deregisters services 212a-b. The SDN switch 210 may be used to separate the data path from the control path. The data path portion resides on the switch and a separate controller makes high-level routing decisions. Services 212a-b may be cloud-computing services (e.g., packet inspection service) that may be deployed on a PaaS platform. The application 214 may be a standard PaaS application used by the client 216. The services 212a-b may act as proxy services to provide features for the application 214 such as security protection, etc. For the services 212a-b to act as proxy services, the services 212a-b may need to inspect packets before the packets arrive at the application 214. For example, a traffic control service (e.g., 212a) may enforce traffic threat protection system (TPS) limit policies to protect the application 214 from denial of service (DOS) attacks.

The services 212a-b, when deployed on a PaaS platform, are registered on the service register 208 with information describing if the service 212a-b should run in a proactive or reactive mode. A service 212a-b may be classified as being in a proactive mode if the service's 212a-b result will not impact the flow of packet transmission (i.e., packet routing). For example, a packet capture service (e.g., 212b) may record whatever the service (e.g., 212b) received, thus the processing result of the service (e.g., 212b) will not impact the routing of the packet. In the case of a reactive service (e.g., 212a), the service's (e.g., 212a) processing of the packet may impact the flow of packet transmission. A reactive service (e.g., 212a) may generate a signal (i.e., result code) that may be sent back to the gateway 202. The overall flow of packet transmission may be proactive or reactive depending on the characteristics of the services chained together. A gateway 202 may be running in reactive mode if any service 212a-b being chained together in the flow of packet transmission has been identified as a reactive service. However, if there are no reactive services 212a-b that are being chained, the gateway 202 may run in proactive mode. The proactive mode is explained in further detail below with respect to FIG. 3 and the reactive mode is explained in further detail below with respect to FIG. 4.

Figure 3:
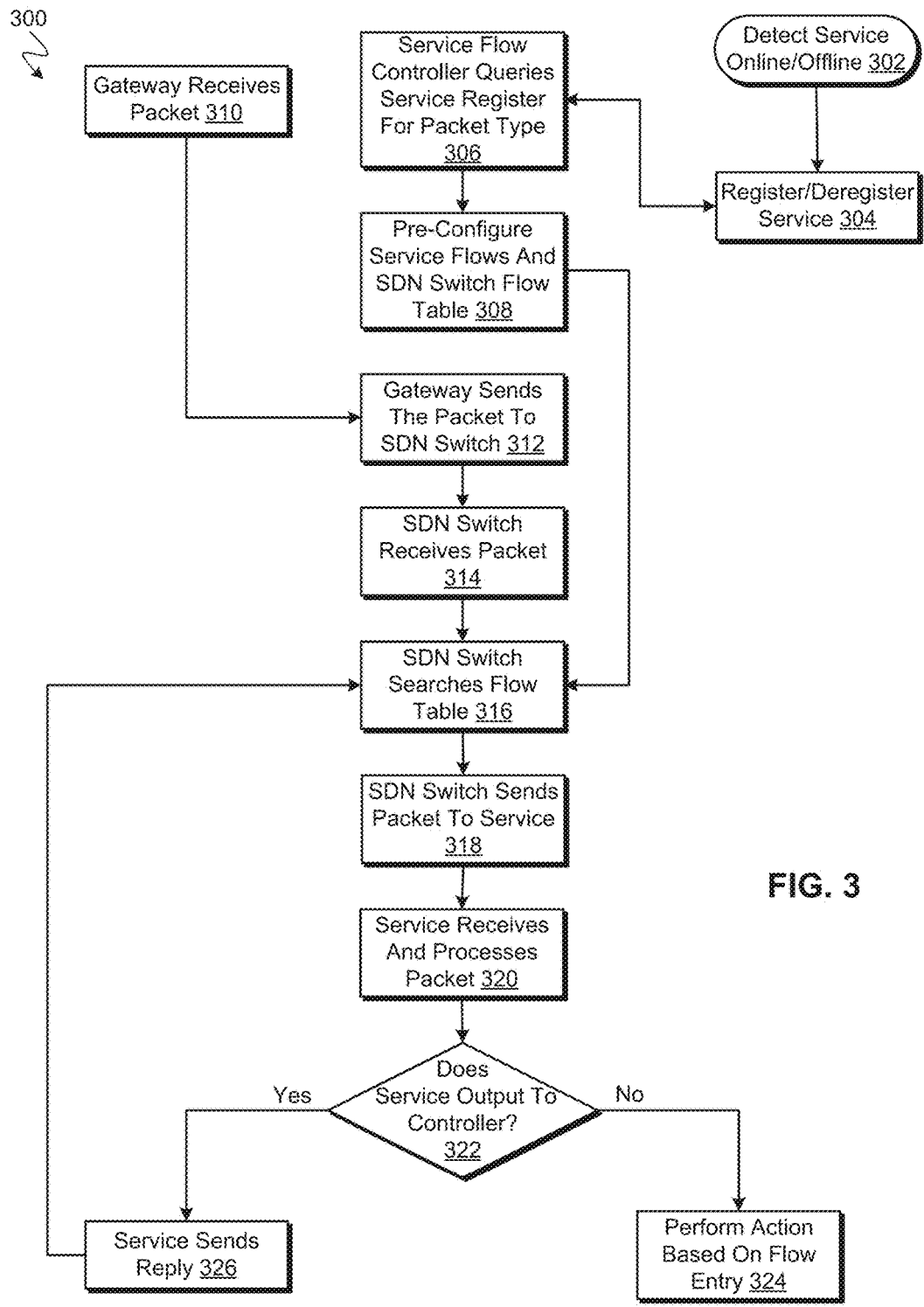
FIG. 3 is an operational flowchart illustrating a process for proactive service orchestration according to at least one embodiment.

Referring now to FIG. 3, an operational flowchart illustrating the exemplary proactive process 300 by the service orchestration program 108a and 108b (FIG. 1) according to at least one embodiment is depicted.

At 302, it may be determined if a service (e.g., 212a: FIG. 2) connected to the SDN switch 210 (FIG. 2) is online or offline. In response to detecting that the service (e.g., 212a: FIG. 2) is online or offline, the service register 208 (FIG. 2) may register the service (e.g., 212a: FIG. 2) if the service (e.g., 212a: FIG. 2) is online, or deregister the service (e.g., 212a: FIG. 2) if the service (e.g., 212a: FIG. 2) is offline at 304. For example, if service 212a (FIG. 2) is determined to be online, the service register 208 (FIG. 2) may register service 212a (FIG. 2) to the SDN switch 210 (FIG. 2).

Next, at configuration time (i.e., pre-runtime), the service flow controller 206 (FIG. 2) may query the service register 208 (FIG. 2) for services 212a-b (FIG. 2) associated with a packet type (e.g., the packet payload may indicate the packet type) of an incoming packet at 306. According to at least one embodiment, the service register 208 (FIG. 2) may return a list of services 212a-b (FIG. 2) that are registered and are designated to process the packet type of the incoming packet.

Based on the query response from the service register 208 (FIG. 2) at 306 and pre-defined configuration data (e.g., service chaining policy), the service flow controller 206 (FIG. 2) pre-configures service flows for the SDN switch flow table at 308. According to at least one embodiment, the pre-configured service flows may be represented as flow entries for the flow table. The flow entries may contain information indicating an action to take, such as directing where to send a packet, modifying a MAC address, or some other action based on the SDN switch 210 (FIG. 2) port that the packet was received (i.e., input field of the flow entry) and the network destination of the packet (i.e., destination field) such as an IP address. For example, a flow entry may contain information indicating that a packet received at the SDN switch's 210 (FIG. 2) input port having an IP address destination to 192.168.123.101 will be sent to the SDN switch port connected to the input of inline packet inspection service 212a (FIG. 2). Additionally, the service flow controller 206 (FIG. 2) may push one or more configured flow entries to the SDN switch 210 (FIG. 2) for the SDN switch 210 (FIG. 2) to update the SDN switch's 210 (FIG. 2) flow table.

At 310, the gateway 202 (FIG. 2) may receive the incoming packet from the client 216 (FIG. 2). The packet may have characteristics including a destination value (e.g., destination IP address) contained in the packet header data. The gateway 202 (FIG. 2) may then send the packet to the SDN switch 210 (FIG. 2) at 312. The SDN switch 210 (FIG. 2) may receive the packet sent by the gateway 202 (FIG. 2) at 314. After receiving the packet, the SDN switch 210 (FIG. 2) may search the SDN switch's 210 (FIG. 2) flow table for a flow table entry (that may include the flow entries previously pushed to the SDN switch 210 (FIG. 2) from the service flow controller 206 (FIG. 2) at 308) that indicates how to handle the packet type of the received packet at 316. For example, the SDN switch's 210 (FIG. 2) flow table may be searched for a flow table entry corresponding to a packet being of a type of packet that is received at the SDN switch's 210 (FIG. 2) input port having an IP address destination to 192.168.123.101. If a matching flow table entry is found that matches the packet type of the incoming packet, the action to take specified in the flow table may be carried out (e.g., the packet will be sent to the SDN switch port connected to the input of inline packet inspection service 212a: FIG. 2).

At 318, the SDN switch 210 (FIG. 2) may send the packet to the service (e.g., 212a: FIG. 2) as indicated in the matching flow entry found in the SDN switch's 210 (FIG. 2) flow table. According to at least one embodiment, the flow entry may be configured to direct the flow of the packet out of the port attached to the SDN switch 210 (FIG. 2) that is connected to the service's (e.g., 212a: FIG. 2) input network interface controller (NIC).

Then, at 320, the service (e.g., 212a: FIG. 2) may receive the packet from the SDN switch 210 (FIG. 2) and may process the packet. For example, inline service (e.g., 212a: FIG. 2) may be a packet inspection service that process the packet by inspecting the packet received from the SDN switch 210 (FIG. 2) for security flaws.

Next, at 322, the proactive service 300 may determine if the service (e.g., 212a: FIG. 2) outputs to the SDN controller 204 (FIG. 2). According to at least one embodiment, the flow table may indicate, based on the port that the SDN switch 210 (FIG. 2) received the packet, that the service's (e.g., 212a: FIG. 2) output is destined for the SDN controller 204 (FIG. 2).

If the proactive process 300 determined that the service (e.g., 212a: FIG. 2) does not output to the SDN controller 204 (FIG. 2) at 322, the proactive process 300 may perform the action indicated by the flow table entry at 324. For example, the flow table entry may indicate that the packet should be sent out the output port of the SDN switch 210 (FIG. 2) and to the packet's destination IP address.

However, if the proactive process 300 determined that the service (e.g., 212a: FIG. 2) does output to the SDN controller 204 (FIG. 2) at 322, the service (e.g., 212a: FIG. 2) may then send output data from the service (e.g., 212a: FIG. 2) to the SDN controller 204 (FIG. 2) at 326. Thereafter, the SDN switch 210 (FIG. 2) may search the flow table for how to handle the next packet at 316.

Figure 4:
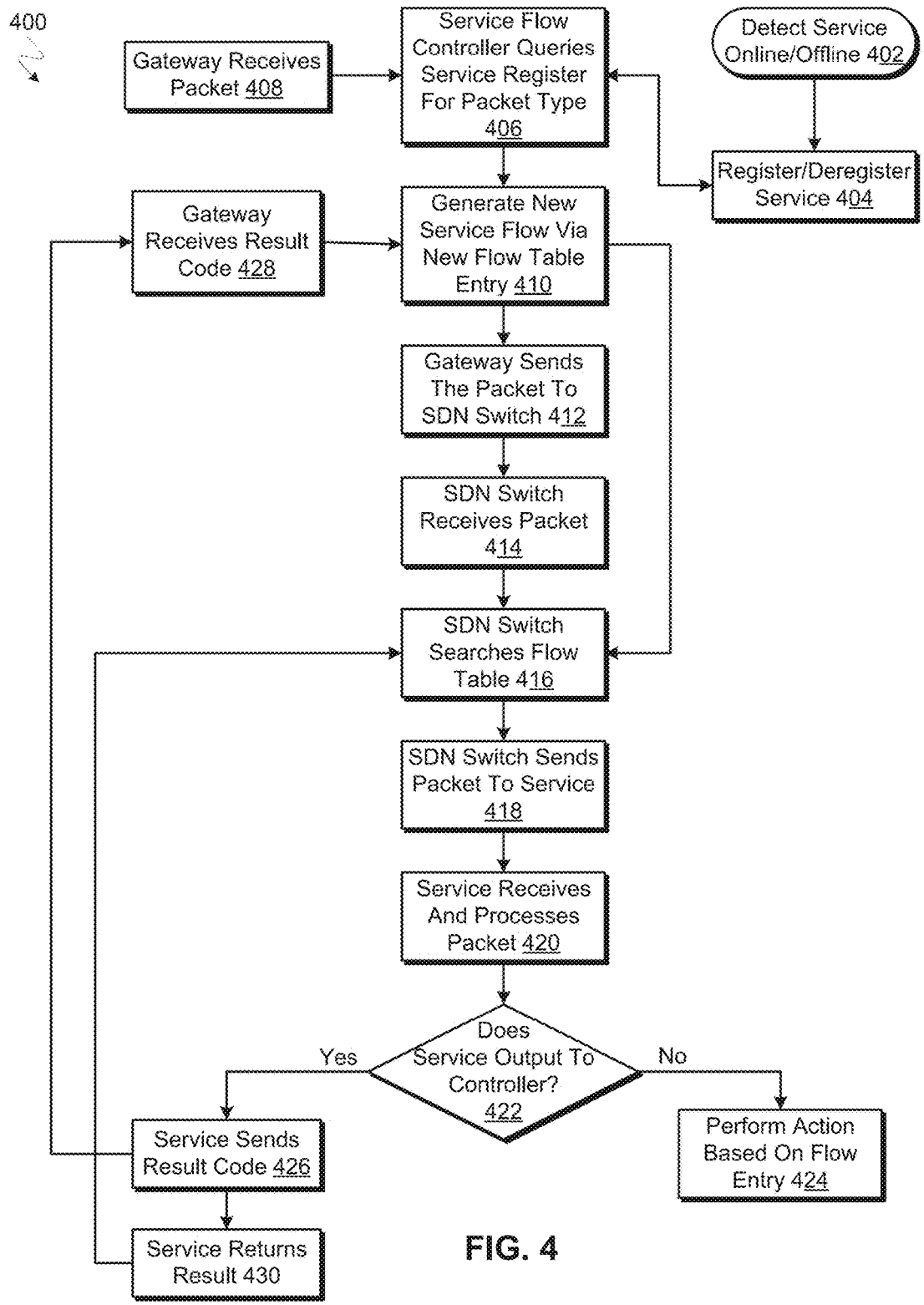
FIG. 4 is an operational flowchart illustrating a process for reactive service orchestration according to at least one embodiment.

Referring now to FIG. 4, an operational flowchart illustrating the exemplary reactive process 400 by the service orchestration program 108a and 108b (FIG. 1) according to at least one embodiment is depicted.

At 402, it may be determined if a service (e.g., 212a: FIG. 2) connected to the SDN switch 210 (FIG. 2) is online or offline. In response to detecting that the service (e.g., 212a: FIG. 2) is online or offline, the service register 208 (FIG. 2) may register the service (e.g., 212a: FIG. 2) if the service (e.g., 212a: FIG. 2) is online, or deregister the service (e.g., 212a: FIG. 2) if the service (e.g., 212a: FIG. 2) is offline at 404. For example, if service 212a (FIG. 2) is determined to be online, the service register 208 (FIG. 2) may register service 212a (FIG. 2) to the SDN switch 210 (FIG. 2).

Next, the service flow controller 206 (FIG. 2) may query the service register 208 (FIG. 2) for services 212a-b (FIG. 2) associated with a packet type (e.g., a packet payload may indicate the packet type) of an incoming packet at 406. According to at least one embodiment, the service register 208 (FIG. 2) may return a list of services 212a-b (FIG. 2) that are registered and are designated to process the packet type of the incoming packet.

Then, at 408, the gateway 202 (FIG. 2) may receive the incoming packet from the client 216 (FIG. 2). At 410, based on the query response from the service register 208 (FIG. 2) at 406, and in some cases a result code (as will be discussed in further detail below), the service flow controller 204 (FIG. 2) may generate a new service flow table for the type of packet received at 410 by creating one or more new flow table entries. The flow entries may contain information indicating where to send a packet (or other action to take) based on the SDN switch 210 (FIG. 2) port that the packet was received and the network destination of the packet (e.g., IP address). For example, a flow entry may contain information indicating that a packet received at the SDN switch's 210 (FIG. 2) input port having an IP address destination to 192.168.123.101 will be sent to the SDN switch port connected to the input of inline packet inspection service 212a (FIG. 2). Additionally, the service flow controller 206 (FIG. 2) may push one or more configured flow entries to the SDN switch 210 (FIG. 2) for the SDN switch 210 (FIG. 2) to update the SDN switch's 210 (FIG. 2) flow table.

Next, at 412, the gateway 202 (FIG. 2) may then send the packet to the SDN switch 210 (FIG. 2) at 412. The SDN switch 210 (FIG. 2) may receive the packet sent by the gateway 202 (FIG. 2) at 414. After receiving the packet, the SDN switch 210 (FIG. 2) may search the flow table for a flow table entry indicating how to handle the received packet type at 416.

At 418, the SDN switch 210 (FIG. 2) may send the packet to the service (e.g., 212a: FIG. 2) as indicated in the matching flow entry found in the SDN switch's 210 (FIG. 2) flow table. According to at least one embodiment, the flow entry may be configured to direct the flow of the packet out of the port attached to the SDN switch 210 (FIG. 2) that is connected to the service's (e.g., 212a: FIG. 2) input network interface controller (NIC).

Then, at 420, the service (e.g., 212a: FIG. 2) may receive the packet from the SDN switch 210 (FIG. 2) and may process the packet. For example, inline service (e.g., 212a: FIG. 2) may be a packet inspection service that process the packet by inspecting the packet received from the SDN switch 210 (FIG. 2) for security flaws.

Next, at 422, the reactive service 400 may determine if the service (e.g., 212a: FIG. 2) outputs to the SDN controller 204 (FIG. 2). According to at least one embodiment, the flow table may indicate, based on the port that the SDN switch 210 (FIG. 2) received the packet, that the service's (e.g., 212a: FIG. 2) output is destined for the SDN controller 204 (FIG. 2).

If the reactive process 400 determined that the service (e.g., 212a: FIG. 2) does not output to the SDN controller 204 (FIG. 2) at 422, the reactive process 400 may perform the action indicated by the flow table entry at 424. For example, the flow table entry may indicate that the packet should be sent out the output port of the SDN switch 210 (FIG. 2) and to the packet's destination IP address.

However, if the reactive process 400 determined that the service (e.g., 212a: FIG. 2) does output to the SDN controller 204 (FIG. 2) at 422, the service (e.g., 212a: FIG. 2) may then generate and send a result code to the gateway 202 (FIG. 2) after the service (e.g., 212a: FIG. 2) finishes processing the packet at 426. According to at least one embodiment the result code may be generated as a result of the service's (e.g., 212a: FIG. 2) processing of the packet and may be used to subsequently alter packet flow. For example, if a service (e.g., 212a: FIG. 2) detects malicious code within the packet, a result code may be generated indicating that malicious code was detected. Then, at 428, the gateway 202 (FIG. 2) may receive the result code the service (e.g., 212a: FIG. 2) sent at 426 to influence subsequent flow entry generation at 410.

Next, at 430, the service (e.g., 212a: FIG. 2) may return the resulting packet after packet processing done at 420 to the SDN switch 210 (FIG. 2).

Figure 5A:
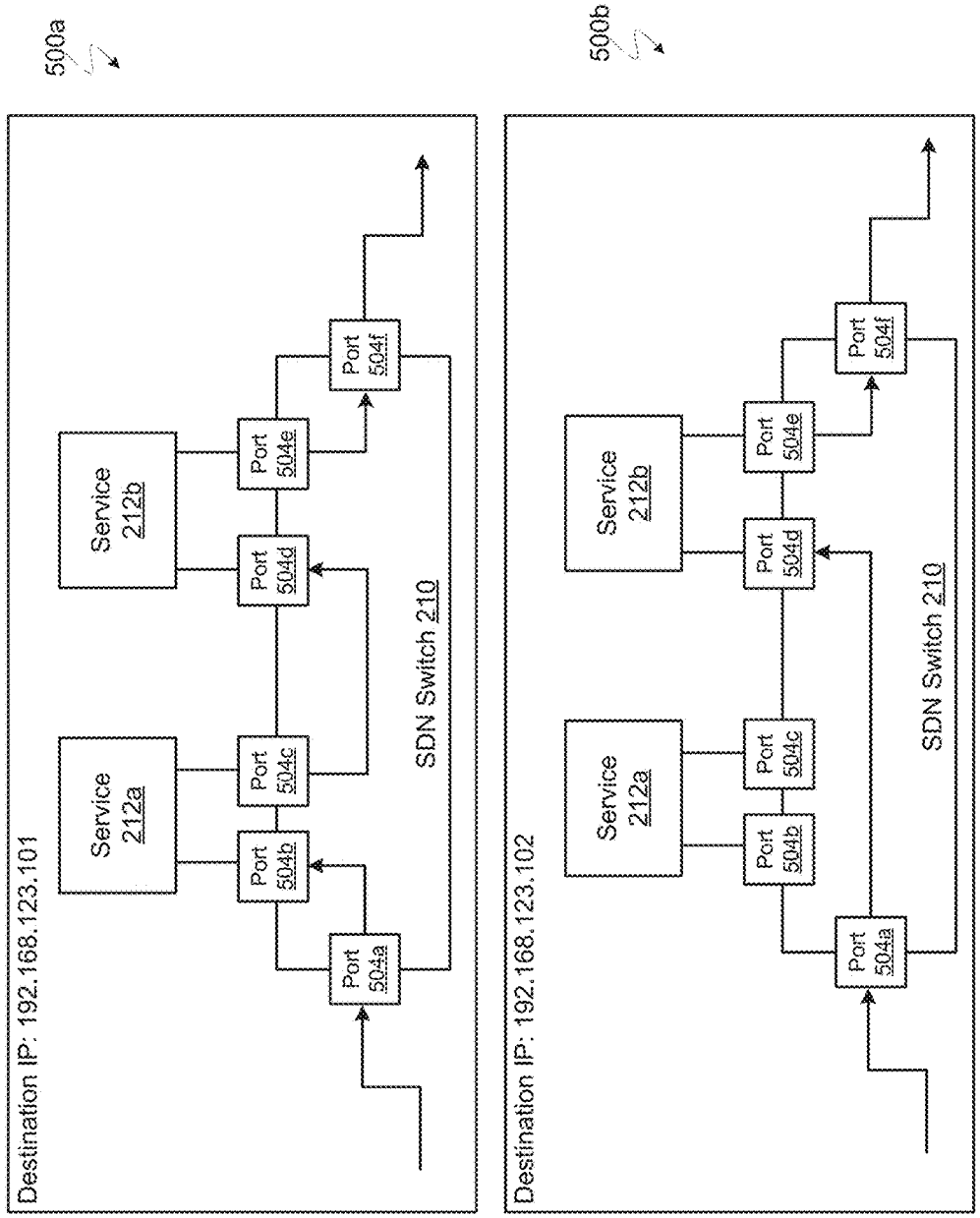
FIG. 5A illustrates two exemplary proactive scenarios according to at least one embodiment.

Referring now to FIGS. 5A and 5B, two exemplary proactive scenarios 500a-b are depicted. Both proactive scenarios 500a and 500b control the flow of a packet based on the proactive process 300 (FIG. 3) described previously. The proactive scenarios 500a-b and proactive flow table 502 depict a situation with an SDN switch 210 having six ports 504a-f and two proactive inline services 212a and 212b. The SDN switch 210 shown is a service switch that only allows network service instances to connect to the SDN switch 210.

Each service 212a-b has two network interface controllers (NICs) connected to the SDN switch 210 ports 504b-e. In both proactive scenarios 500a-b, the two NICs of service 212a connect to the SDN switch 210 via ports 504b and 504c. The two NICs of service 212b connect to the SDN switch 210 via ports 504d and 504e. Additionally, SDN switch 210 has an input port 504a and output port 504f.

In proactive scenario 500a, the two services (i.e., service 212a and service 212b) are online and available for packets destined to internet protocol (IP) address 192.168.123.101. The incoming packet enters the SDN switch 210 via input port 504a destined for IP address 192.168.123.101 from the gateway 202 (FIG. 2) (based on previously described step 312: FIG. 3). After the SDN switch 210 receives the packet (based on previously described step 314: FIG. 3), the SDN switch 210 searches the proactive flow table 502 (based on previously described step 316: FIG. 3). After searching the flow table 502, the proactive process 300 (FIG. 3) will determine that the packet is destined for an inline service (i.e., 212a) since the first row (i.e., flow entry 1) of the proactive flow table 502 corresponds to the situation when a packet arrives at port 504a destined for IP address 192.168.123.101 and indicates that the action to be taken is to send the packet to a service (i.e., 212a).

As indicated in proactive flow table 502, the SDN switch 210 then sends the packet out of port 504b leading to inline service 212a (based on previously described step 318: FIG. 3). The inline service 212a then receives and processes the packet (based on previously described step 320: FIG. 3). The proactive process 300 (FIG. 3) may then determine if service 212a outputs to the SDN controller 204 (FIG. 2) (based on previously described step 322: FIG. 3). Since the proactive flow table 502 does not indicate that the service 212a outputs to the SDN controller 204 (FIG. 2), the proactive process 300 (FIG. 3) will perform the action indicated in the next applicable flow entry for the packet in the proactive flow table 502.

Thereafter, the packet is sent out the service's 212a NIC and back in to the SDN switch 210 through port 504c. The SDN switch 210 then performs the next action indicated in the applicable flowchart entry (i.e., flow entry 2) for handling a packet that enters port 504c and is destined for IP address 192.168.123.101 (based on previously described step 324: FIG. 3). The proactive flow table 502 indicates at row two (i.e., flow entry 2) that the SDN switch 210 will send the packet out of port 504d. The SDN switch 210 then sends the packet out port 504d to the input NIC of inline service 212b connected to port 504d (based on previously described step 318: FIG. 3).

Service 212b will receive and process the packet (based on previously described step 320: FIG. 3). Next, the proactive process 300 (FIG. 3) may determine if service 212b outputs to the SDN controller 204 (FIG. 2) (based on previously described step 322: FIG. 3). Since the proactive flow table 502 does not indicate that the service 212b outputs to the SDN controller 204 (FIG. 2), the proactive process 300 (FIG. 3) will perform the action indicated in the next applicable flow entry for the packet in the proactive flow table 502.

Thereafter, the packet is sent out the service's 212b NIC and back in to the SDN switch 210 through port 504e. The SDN switch 210 then performs the next action indicated in the applicable flowchart entry (i.e., flow entry 3) for handling a packet that enters port 504e and destined for IP address 192.168.123.101 (based on previously described step 324: FIG. 3). The proactive flow table 502 indicates at row three (i.e., flow entry 3) that the SDN switch 210 will send the packet out of port 504f. The SDN switch 210 then sends the packet out the output port 504f to IP address 192.168.123.101 based on the action specified in the flow table.

In proactive scenario 500b, one inline service 212b is online (i.e., inline service 212a is not online) and available for packets destined for IP address 192.168.123.102. In proactive scenario 500b, an incoming packet enters the SDN switch 210 via input port 504a destined for IP address 192.168.123.102 from the gateway 202 (FIG. 2) (based on previously described step 312: FIG. 3). After the SDN switch 210 receives the packet (based on previously described step 314: FIG. 3), the SDN switch 210 searches the proactive flow table 502 (based on previously described step 316: FIG. 3). After finding the correct proactive flow table 502 entry, the proactive process 300 (FIG. 3) will determine that the packet is destined for an inline service (i.e., 212b) since the fourth row (i.e., flow entry 4) of the proactive flow table 502 corresponds to the situation when a packet arrives at port 504a destined for IP address 192.168.123.102.

As indicated in flow entry 4 of the proactive flow table 502, the SDN switch 210 sends the packet out of port 504d leading to inline service 212b (based on previously described step 318: FIG. 3). The inline service 212b then receives and processes the packet (based on previously described step 320: FIG. 3). Next, the proactive process 300 (FIG. 3) may determine if service 212b outputs to the SDN controller 204 (FIG. 2) (based on previously described step 322: FIG. 3). Since the proactive flow table 502 does not indicate that the service 212b outputs to the SDN controller 204 (FIG. 2), the proactive process 300 (FIG. 3) will perform the action indicated in the next applicable flow entry for the packet in the proactive flow table 502.

Thereafter, the packet is sent out the service's 212b NIC and back in to the SDN switch 210 through port 504e. The SDN switch 210 then performs the next action indicated in the applicable flowchart entry (i.e., flow entry 5) for handling a packet that enters port 504e and destined for IP address 192.168.123.102 (based on previously described step 324: FIG. 3). The proactive flow table 502 indicates at row five (i.e., flow entry 5) that the SDN switch 210 will send the packet out of port 504f. The SDN switch 210 then sends the packet out the output port 504f to IP address 192.168.123.102 based on the action specified in the flow table.

Figure 6A:
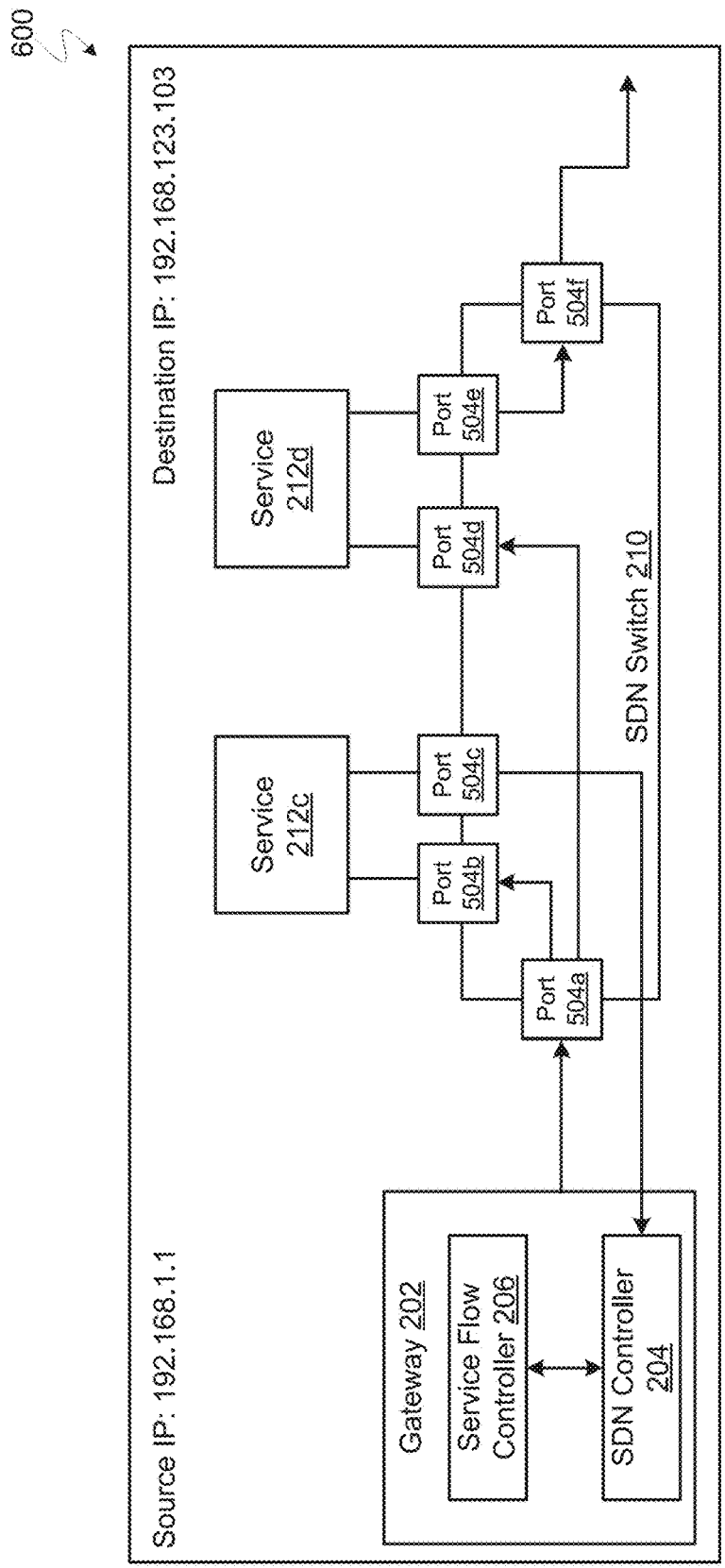
FIG. 6A illustrates an exemplary reactive scenario according to at least one embodiment.

Referring now to FIGS. 6A and 6B, an exemplary reactive scenario 600 is depicted. The reactive scenario 600 illustrates packet flow control based on the reactive process 400 (FIG. 4) described previously for packets having a destination IP address of 192.168.123.103.

The reactive scenario 600 and reactive flow table 602 illustrate a scenario with an SDN switch 210 having six ports 504a-f, two inline services 212c-d, and a gateway 202. The SDN switch 210 shown is a service switch that only allows network service instances to connect to the SDN switch 210. The gateway 202 includes the service flow controller 206 and SDN controller 204.

Each service 212c-d has a two network interface controllers (NICs) connected to the SDN switch 210 ports 504a-f. In reactive scenario 600, the two NICs of service 212c connect to the SDN switch 210 (i.e., via ports 504b and 504c) and the two NICs of service 212d connect to the SDN switch 210 (i.e., via ports 504d and 504e). Additionally, the SDN switch 210 has an input port 504a and output port 504f. The gateway 202 connects to the SDN switch 210 via the input port 504a.

The reactive flow table 602, is generated according to reactive process 400 (FIG. 4) (based on previously described step 410: FIG. 4), initially only including the first row (i.e., flow entry 1) and second row (i.e., flow entry 2) with subsequent rows being generated on a reactionary basis by the reactive process 400 (FIG. 4). When the services 212c-d are initially registered by the service register 208 (FIG. 2), they are identified as being in either reactive mode or proactive mode (based on previously described step 404: FIG. 4). In the reactive scenario 600, service 212c is identified as being in reactive mode and service 212d is identified as being in proactive mode. Since at least one service (i.e., 212c) is operating in reactive mode, the reactive process 400 (FIG. 4) is used to control the flow of the packet.

In reactive scenario 600, the two services (i.e., service 212c and service 212d) are online and available for packets destined to internet protocol (IP) address 192.168.123.103. The incoming packet is transmitted from the gateway 202 to the SDN switch 210 via input port 504a destined for IP address 192.168.123.103 (based on previously described step 412: FIG. 4). After the SDN switch 210 receives the packet (based on previously described step 414: FIG. 4), the SDN switch 210 searches the reactive flow table 602 for an applicable flow entry (based on previously described step 416: FIG. 4). After finding the correct flow table entry, the reactive process 400 (FIG. 4) will determine what inline service (e.g., 212c) the packet is destined for (based on previously described step 418: FIG. 4). Since the first row (i.e., flow entry 1) of the reactive flow table 602 corresponds to the situation when a packet arrives at port 504a destined for IP address 192.168.123.103, the SDN switch 210 will send the packet out of port 504b leading to inline service 212c (based on previously described step 418: FIG. 4). Then, service 212c receives and processes the packet (based on previously described step 420: FIG. 4).

Next, the SDN switch 210 will determine if the service (i.e., 212c) outputs to the SDN controller 204 by searching the reactive flow table 602 for a flow entry indicating where the service's 212c output will be sent. The reactive flow table 602 at flow entry 2 indicates that service 212c output is sent TO_CONTROLLER (i.e., sent to the SDN controller 204). Thus, the reactive process 400 (FIG. 4) will determine that the service 212c does output to the SDN controller 204 (based on previously described step 422: FIG. 4). The service 212c will then send a result code to the SDN controller 204 located in the gateway 202 (based on previously described step 426: FIG. 4). After the SDN controller 204 receives the result code (based on previously described step 428: FIG. 4), the SDN controller 204 will parse the result code signal and determine where the remaining packets should be routed (based on previously described step 410: FIG. 4). The SDN controller 204 within the gateway 202 will then push new flow entries (i.e., flow entry 3 and 4) to the SDN switch's 210 reactive flow table 602 (based on previously described step 410: FIG. 4).

Next, the SDN switch 210 will search the reactive flow table 602 for the correct flow entry to handle the next packet (based on previously described step 416: FIG. 4). Flow entry 3 will be selected by the reactive process 400 (FIG. 4) for sending the next packet based on the source (i.e., nw_src) being IP address 192.168.1.1, the port 504a-f that the packet was received (i.e., in_port) being input port 504a and the packet destination being IP address 192.168.123.103. As indicated in flow entry 3, the packet received at port 504a will be routed to proactive service 212d via port 504d (i.e., actions=Output: 504d) (based on previously described step 418: FIG. 4). Thereafter, proactive service 212d receives and processes the packet (based on previously described step 420: FIG. 4). Once the proactive service 212d finishes processing the packet, the SDN switch 210 will search the reactive flow table 602 for the next relevant flow entry. The SDN switch 210 will select flow entry 4 which corresponds to the packet being received at port 504e from IP address 192.168.1.1 destined for IP address 192.168.123.103. The reactive process 400 (FIG. 4) will determine (based on previously described step 422: FIG. 4) that the proactive service 212d does not output to the controller and therefore the reactive process 400 (FIG. 4) will perform the action specified in the selected flow entry (i.e., flow entry 4) (based on previously described step 424: FIG. 4). Flow entry 4 specifies that the packet will be sent out the SDN switch's 210 output port 504f (i.e., actions=Output: 504f) to IP address 192.168.123.103.

It may be appreciated that FIGS. 2, 3, 4, 5A, 5B, 6A, and 6B provide only an illustration of a few embodiments and does not imply any limitations with regard to how different embodiments may be implemented. Many modifications to the depicted embodiment(s) may be made based on design and implementation requirements.

Figure 7:
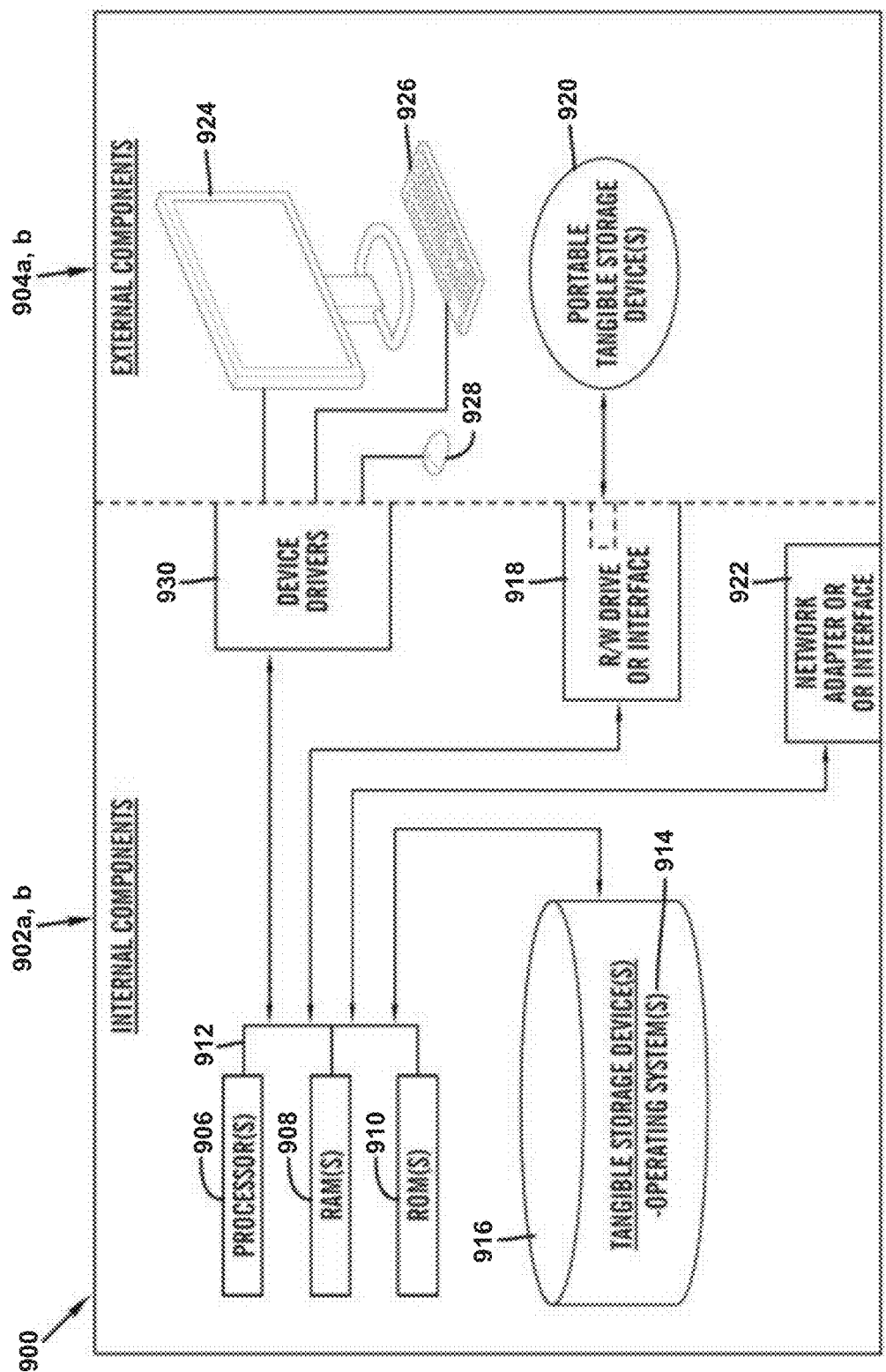
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 110 (FIG. 1) may include respective sets of internal components 902 a, b and external components 904 a, b illustrated in FIG. 7. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and programs such as a service orchestration program 108a and 108b (FIG. 1), may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. The service orchestration program 108a and 108b (FIG. 1) can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The service orchestration program 108a (FIG. 1) in client computer 102 (FIG. 1) and the service orchestration program 108b (FIG. 1) in network server computer 110 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the service orchestration program 108a (FIG. 1) in client computer 102 (FIG. 1) and the service orchestration program 108b (FIG. 1) in network server computer 110 (FIG. 1) are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
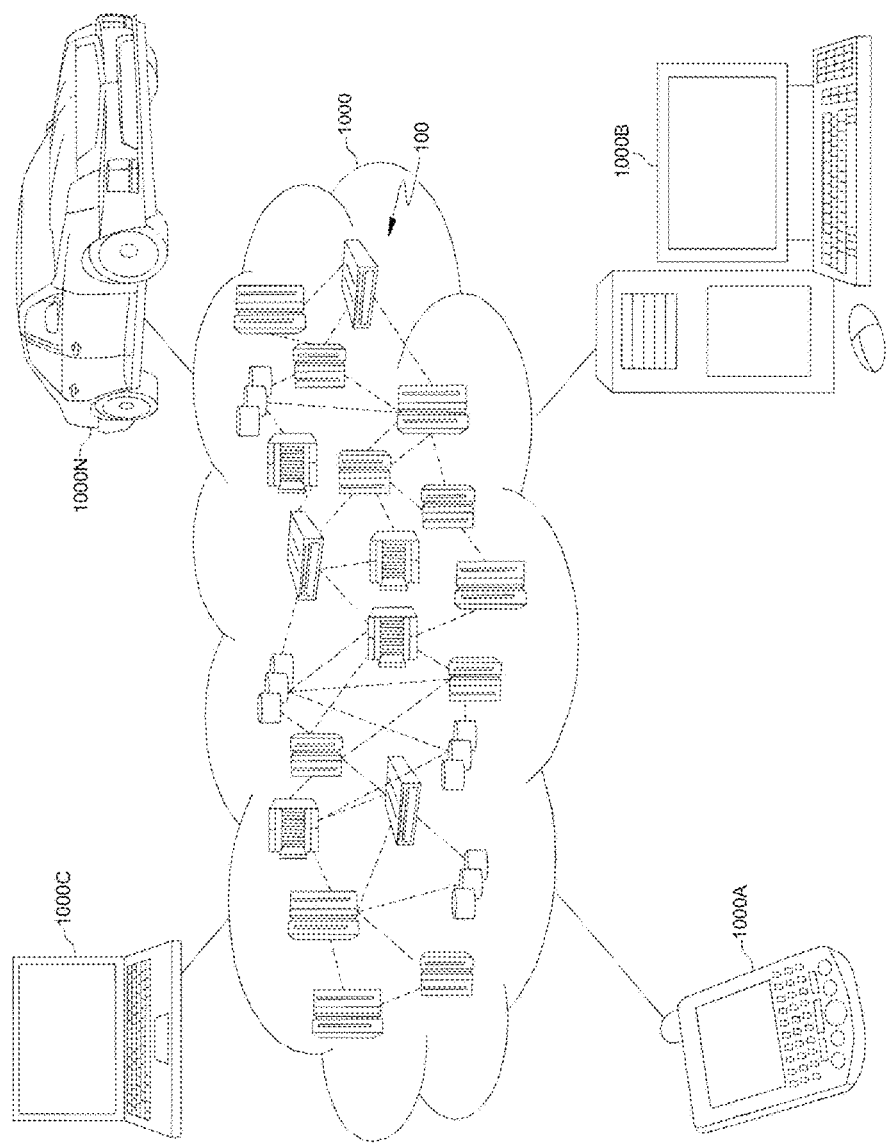
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 100 and cloud computing environment 1000 can communicate with any type of computerized device over any type of network and/or network addressable connection (e.g., using a web browser).

Figure 9:
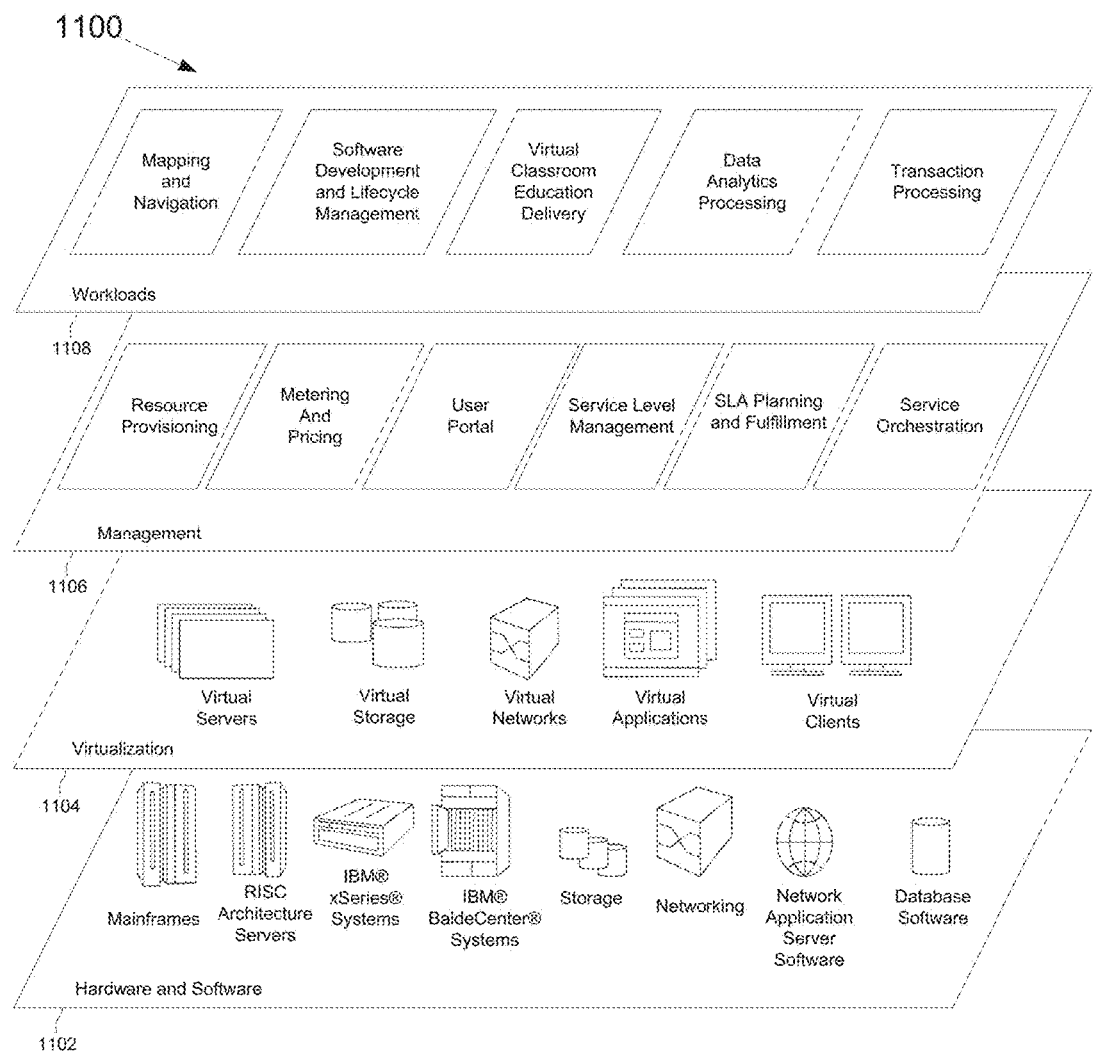
FIG. 9 is a block diagram of functional layers of the illustrative cloud computing environment of FIG. 8, in accordance with an embodiment of the present disclosure.

Referring now to FIG. 9, a set of functional abstraction layers 1100 provided by cloud computing environment 1000 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Service orchestration may be provided to a PaaS platform to make infrastructure service orchestration feasible with minimal performance impact.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for orchestrating a flow of a packet through a software-defined network (SDN) switch within a Platform as a service (PaaS) platform, the method comprising:
   determining at least one available PaaS service associated with the SDN switch within the PaaS platform;
   receiving the packet at the SDN switch, wherein the packet has a destination value and a packet type;
   generating a flow entry based on the at least one available PaaS service and the packet type, wherein the flow entry has a plurality of entry characteristics and an action;
   selecting the flow entry based on matching the plurality of entry characteristics to the destination value and the packet type; and
   performing the action associated with the selected flow entry.

2. The method of claim 1, wherein the plurality of entry characteristics comprises a destination field and an input field.

3. The method of claim 2, wherein matching the plurality of entry characteristics to the destination value and the packet type comprises matching the input field of the flow entry to the input port, and matching the destination field of the flow entry to the destination value associated with the packet.

4. The method of claim 1, wherein the action comprises sending the packet out an output port associated with the SDN switch.

5. The method of claim 4, wherein the sending the packet out an output port associated with the SDN switch comprises sending the packet to a service within the at least one available service.

6. The method of claim 5, wherein the service sends a result code based on the packet.

7. The method of claim 6, further comprising:
receiving the result code from the service; and
generating a new flow entry based on the received result code.

8. A computer system for orchestrating a flow of a packet through a software-defined network (SDN) switch within a Platform as a service (PaaS) platform, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
determining at least one available PaaS service associated with the SDN switch within the PaaS platform;
receiving the packet at the SDN switch, wherein the packet has a destination value and a packet type;
generating a flow entry based on the at least one available PaaS service and the packet type, wherein the flow entry has a plurality of entry characteristics and an action;
selecting the flow entry based on matching the plurality of entry characteristics to the destination value and the packet type; and
performing the action associated with the selected flow entry.

9. The computer system of claim 8, wherein the plurality of entry characteristics comprises a destination field and an input field.

10. The computer system of claim 9, wherein matching the plurality of entry characteristics to the destination value and the packet type comprises matching the input field of the flow entry to the input port, and matching the destination field of the flow entry to the destination value associated with the packet.

11. The computer system of claim 8, wherein the action comprises sending the packet out an output port associated with the SDN switch.

12. The computer system of claim 11, wherein the sending the packet out an output port associated with the SDN switch comprises sending the packet to a service within the at least one available service.

13. The computer system of claim 12, wherein the service sends a result code based on the packet.

14. The computer system of claim 13, further comprising:
receiving the result code from the service; and
generating a new flow entry based on the received result code.

15. A computer program product for orchestrating a flow of a packet through a software-defined network (SDN) switch within a Platform as a service (PaaS) platform, comprising:
one or more computer-readable storage medium and program instructions stored on at least one of the one or more tangible storage medium, the program instructions executable by a processor, the program instructions comprising:
program instructions to determine at least one available PaaS service associated with the SDN switch within the PaaS platform;
program instructions to receive the packet at the SDN switch, wherein the packet has a destination value and a packet type;
program instructions to generate a flow entry based on the at least one available PaaS service and the packet type, wherein the flow entry has a plurality of entry characteristics and an action;
program instructions to select the flow entry based on matching the plurality of entry characteristics to the destination value and the packet type; and
program instructions to perform the action associated with the selected flow entry.

16. The computer program product of claim 15, wherein the plurality of entry characteristics comprises a destination field and an input field.

17. The computer program product of claim 16, wherein matching the plurality of entry characteristics to the destination value and the packet type comprises matching the input field of the flow entry to the input port, and matching the destination field of the flow entry to the destination value associated with the packet.

18. The computer program product of claim 15, wherein the action comprises sending the packet out an output port associated with the SDN switch.

19. The computer program product of claim 18, wherein the sending the packet out an output port associated with the SDN switch comprises sending the packet to a service within the at least one available service.

20. The computer program product of claim 19, wherein the service sends a result code based on the packet.

* * * * *